United States Patent Office 3,525,994
Patented Aug. 25, 1970

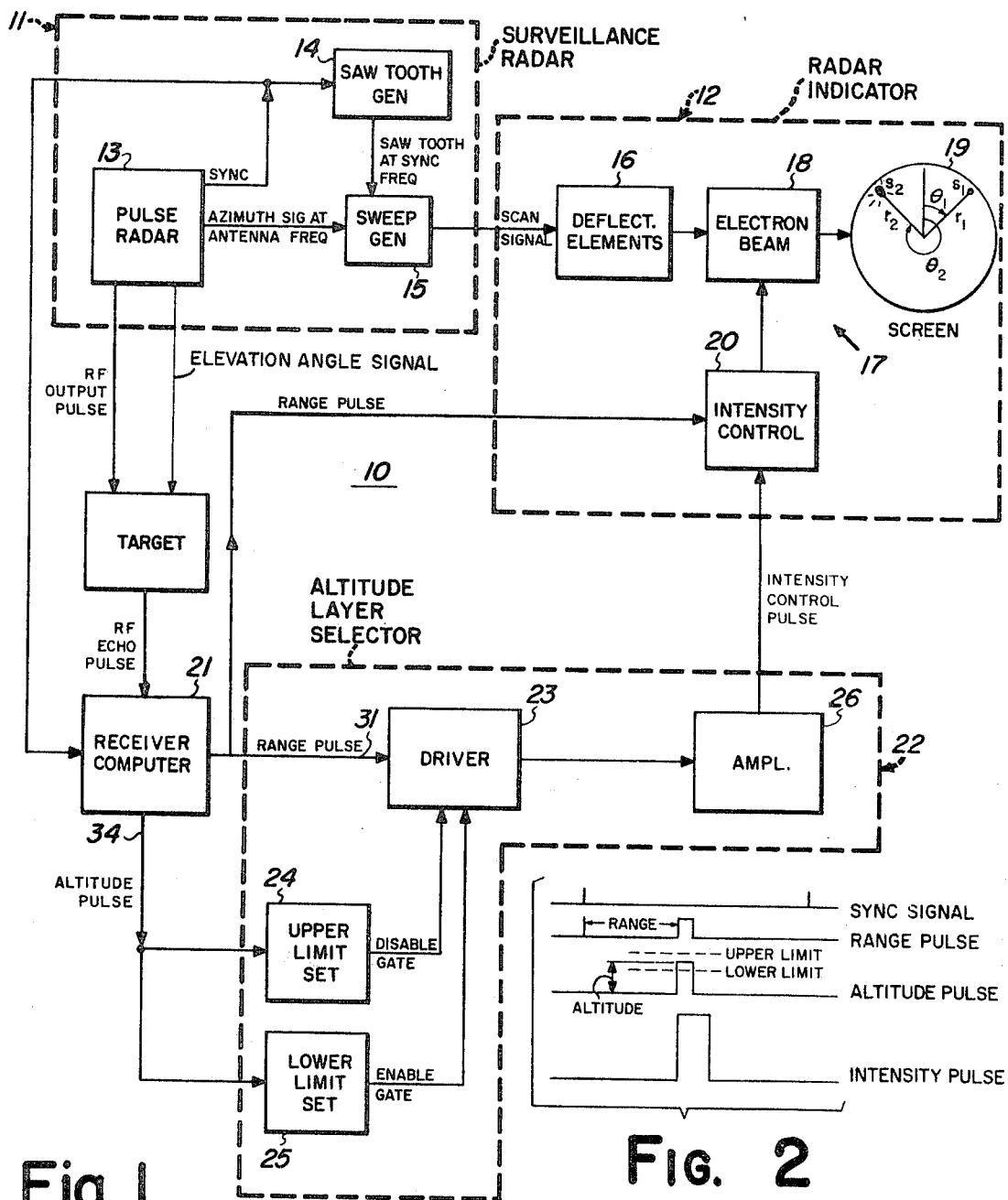

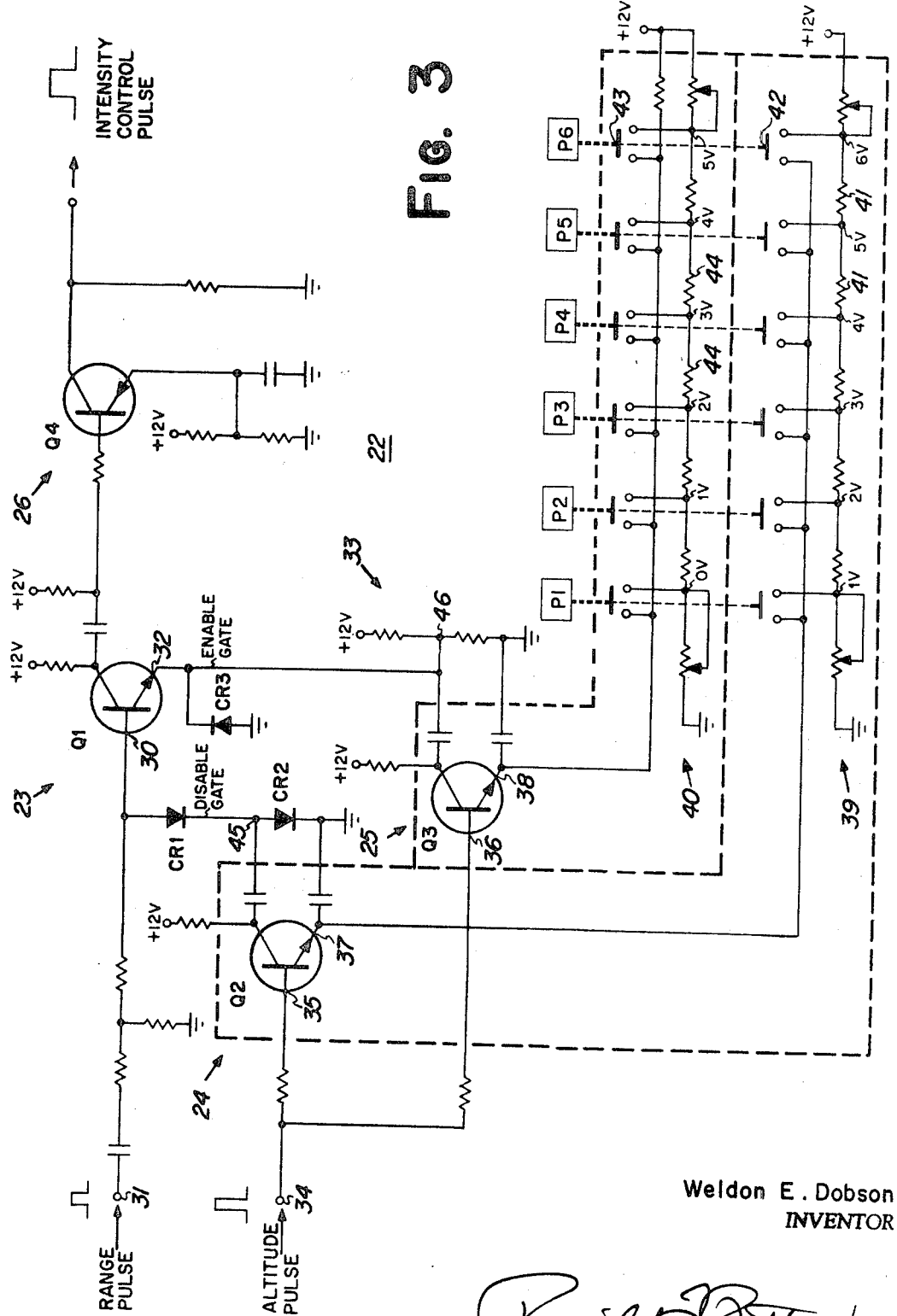

3,525,994
RADAR SYSTEM INCLUDING ALTITUDE LAYER SELECTOR
Weldon E. Dobson, Westminster, Md., assignor to AAI Corporation, Cockeysville, Md., a corporation of Maryland
Continuation-in-part of application Ser. No. 428,927, Jan. 29, 1965. This application Aug. 28, 1967, Ser. No. 663,804
Int. Cl. G01s 9/06, 7/12; H01i 29/52
U.S. Cl. 343—11                                 16 Claims

ABSTRACT OF THE DISCLOSURE

A surveillance radar system is disclosed which produces range, azimuth and analog altitude signals having values representative of the positions of the targets in the area under surveillance and displays the range and azimuth positions of the targets on a conventional PPI screen of a single color cathode roy tube as spots having a common fixed degree of intensity, size and duration. Apparatus responsive to the amplitude of the analog altitude signals is provided to enable an air traffic controller to determine which targets are within the upper and lower altitude limits of a selected altitude layer by causing the spots displayed on the PPI screen and representative of targets within the selected altitude layer to be increased by a fixed amount in intensity, size and duration to distinguish them from the spots having a common fixed degree of intensity, size and duration and representing targets above and below the upper and lower altitude limits of the selected altitude layer.

---

This application is a continuation-in-part of co-pending application Ser. No. 428,927, filed Jan. 29, 1965, now abandoned, and prior application Ser. No. 190,473, filed Apr. 26, 1962, now abandoned.

This invention relates to surveillance radar systems providing values of target azimuth range and height, or information translatable into such values, such as the conventional surveillance radar in which a radar beam or a plurality of azimuthally aligned beams, rotate in azimuth and at the same time scan in elevation, and more particularly to an improved radar system having an indicator for displaying range-azimuth coordinates of targets within an area under surveillance, with provision for altitude layer selection and display, as well as to a unique surveillance display system having provision for display of targets within selected altitude layers.

Surveillance radar systems are those systems with a range of about 50 miles frequently used by air traffic controllers to observe and control air traffic in the vicinity of air terminals. The pertinent information obtained by such radars is the range-azimuth coordinates of aircraft under the controller's surveillance. Such information is conventionally displayed on an indicator using a type P scan whereon each target appears on a monochrome or single color cathode ray tube (CRT) screen as an illuminated spot, the radial and angular displacements of which are measures of the slant range and azimuth coordinates of the target identified with the spot. With this type of scan, targets at substantially the same azimuth and substantially the same range, but at different altitudes cannot be resolved. Thus, an aircraft on a flight path that would cause it to actually cross another aircraft with a safe altitude difference would appear to the controller as being on a collision course. Unless the controller was assured that the aircraft were at different altitudes, he would be forced to order them to change their flight paths. This unnecessary variation in flight paths wastes considerable time for both the aircraft involved and the controller, and can be accomplished under heavy traffic conditions only if a substantial reduction in traffic handling efficiency can be tolerated.

In order to eliminate the ambiguity in target altitude, the conventional radar target data is supplemented with altitude information on each target. However, in the absence of a three-dimensional display, the supplemental information cannot conveniently be displayed and prior to this invention, could not effectively be displayed on the conventional PPI screen of the radar indicator.

It is therefore an object of this invention to provide a radar system wherein altitude information can be effectively and selectively displayed with range and azimuth data on a conventional PPI screen without modification to the indicator.

It is a further object of this invention to provide a radar system wherein range and azimuth data of all targets in the area under surveillance are displayed on a conventional single color PPI screen and altitude data of targets within the upper and lower altitude values of an altitude layer is displayed on the same single color conventional PPI screen in a manner to distinguish the targets within the preselected altitude layer from other targets which are outside the preselected altitude layer, particularly by visual emphasis through increasing the intensity, size and duration of the target spot.

The invention achieves this object by changing the illumination of the spots representing the targets whose altitudes lie within a preselected altitude layer without eliminating the spots representing the targets whose altitudes are outside the preselected altitude layer. Briefly, the invention utilizes an altitude layer selector to which analog altitude pulses are applied in time coincidence with range pulses resulting from the same targets. An analog altitude pulse applied to the altitude layer selector creates an enabling signal only if the amplitude of the analog altitude pulse exceeds a preselected value of the lower altitude limit selected by the controller, and a disabling signal only if the amplitude exceeds a preselected value of the upper altitude limit selected by the controller. If an analog altitude pulse lies within the preselected values of the upper and lower altitude limits, the range pulse is greatly increased in amplitude and duration and applied simultaneously with the range pulse that modulates the electron beam intensity of the CRT in the radar indicator. As a result, the spots, representing the targets whose altitudes lie within an altitude layer preselected by the controller, are caused to bloom, i.e. are increased in intensity, duration and size, providing a visual identification of those targets within the preselected altitude layer by contrasting them with the spots representing the targets outside the preselected altitude layer selector according to the present invention can be used with a conventional radar indicator without modification thereof.

Still other objects, features, and attendant advantages will become apparent to those skilled in the art from a reading of the following detailed description of several physical embodiments constructed in accordance with the invention, taken in conjunction with the accompanying drawings wherein:

FIG. 1 is a block diagram of one physical embodiment according to the invention;

FIG. 2 is a time sequence graph showing the relative occurrences of the range, altitude and intensity control pulses;

FIG. 3 is a preferred construction of the altitude layer selector shown in FIG. 1.

Referring now to FIG. 1, a conventional surveillance radar system is indicated generally at 10 and includes a surveillance radar 11 and a radar indicator 12. The surveillance radar 11 includes a pulse radar 13, a sawtooth generator 14 and a sweep generator 15. The radar 13 may include a rotatable antenna (not shown) which causes the radar to transmit a beam of RF energy narrow in azimuth and vertically swept at a relatively fast rate through a broad vertical angle as the antenna rotates in azimuth in accordance with conventional practice. Such practice is old and conventional in the art, as for instance as described in Radar System Engineering, first edition, 1947, and Watson et al., Great Britain, Pat. No. 588,851, June 1947. The repetition period for the pulses is very much shorter than the rotational period of the antenna. As a result, a great many RF pulses are transmitted in the vertical sweep pattern from the antenna at a given azimuth position thereof.

Although the surveillance radar herein described is of the type having a transmitted beam of RF energy vertically swept at a relatively fast rate through a broad vertical angle, which may be accomplished by either mechanically pivoting the antenna up and down or electrically sweeping the beam, it is to be understood that the surveillance radar could transmit a beam of RF energy narrow in azimuth and having a broad vertical angle used in conjunction with a separate stationary receiver having an antenna array which is adapted to detect slight phase differences in the echo pulse from targets at different elevations.

The sync pulses which coincide with the transmitted RF pulses are applied to a generator 14 which produces a sawtooth signal at the sync frequency. This sawtooth signal and the azimuth signal at the antenna rotation frequency are applied to sweep generator 15 to produce a scan signal that is applied to the deflection elements 16 of a CRT 17 of the indicator 12. The CRT 17 also includes means for producing an electron beam 18, a luminescent screen 19 on which the electron beam impinges, and an intensity control 20 which is capable of varying the intensity of the electron beam 18.

In a type P scan, the scan signal contains range-azimuth information, and is applied to the deflection elements 16 to cause the electron beam 18 to scan screen 19 in the manner peculiar to a type P scan. As each RF pulse is transmitted from the antenna when it is at a particular azimuth bearing, the electron beam is displaced from the center to the edge of the screen 19 along a radial line that corresponds to the particular azimuth bearing of the antenna. Upon reaching the edge of the screen 19, the electron beam is rapidly returned to the center to again be displaced when the next RF pulse is transmitted. As the antenna rotates, the radial path traversed by the beam revolves around the indicator screen 19.

When the antenna is directed at a target, the transmitted RF pulse is reflected by the target and received by the receiver-computer 21 as an RF echo pulse. The interval of time between the transmission of the RF pulse and the receipt of the RF echo pulse is a measure of the target range. The RF echo pulse is received by a radar receiver-computer 21 which produces a range pulse of a predetermined and fixed duration that is applied to an intensity control 20. Upon receipt of a range pulse, the intensity control 20 increases the intensity of the electron beam 18 impinging on the screen 19 of the CRT 17. The screen 19 of the CRT 17 is conventional and the impinging electron beam causes the screen 19 to fluoresce with a single color and produce an illuminated spot representative of a target with the radial displacement of the spot being indicative of the range of the target and with the angular position of the spot being indicative of the azimuth bearing of the target.

In this radar system which is particularly adapted for air traffic control purposes, screen 19 shows the aircraft within the area under surveillance. For clarity purposes, only two spots $S_1$ and $S_2$ are shown on screen 19. Spot $S_1$ represents an object at range $r_1$ and azimuth bearing $\theta_1$, and spot $S_2$ represents an object at range $r_2$ and azimuth bearing $\theta_2$.

The receiver-computer 21 has a continuous elevation angle input from the radar antenna or antenna control, as well as an RF echo pulse reflected from each target due to RF energy originating from radar 13. Knowing the angle of elevation of a target and its slant range, the altitude of the target can be computed. The receiver-computer 21, using the sync signal from the radar and the reflected energy from a target, produces a range pulse and an analog altitude pulse representative of the position of each target which are in time coincident with each other. Any other device producing analog altitude signals representative of the targets in the area under surveillance could be used.

The range pulse and the analog altitude pulses produced by the receiver-computer 21 are applied in coincidence to the altitude layer selector, with the range pulse being applied to the driver 23, and the analog altitude pulse being applied to both the upper limit set 24 and the lower limit set 25. The upper and lower limit sets 24, 25 are operable by the air traffic controller to select an altitude layer to be inspected, and accordingly the altitude layer selector permits only those spots representing aircraft within the selected altitude layer to be visually distinguished from other spots on the screen 19 representing aircraft outside the selected altitude layer. This is accomplished by permitting the driver 23 to produce an output in response to the range pulse only when the amplitude of the coincident analog altitude pulse lies within the particular upper and lower limit values selected by the controller.

The output of the driver 23, which is fixed in both intensity and duration, is supplied to the amplifier 26 which in turn produces an intensity control pulse that is applied to the intensity control 20 simultaneously with the range pulse from the receiver-computer 21. Since the intensity control pulse has a greater amplitude and longer duration than the range pulse, the spot produced on screen 19 blooms with a greater fixed degree of intensity, duration, and size relative to the common intensity, duration and size of the other spots displayed on the screen which represent targets outside the selective altitude layer, thereby providing a visual indication that a particular target is within the particular altitude layer selected by the controller. Since the upper and lower limit sets 24, 25 are adjustable, the controller can quickly confirm an aircraft's altitude furnished by the aircraft, and can easily determine whether a pair of aircraft are on a collision course.

To describe the operation of the altitude layer selector upon a conventional surveillance, it must be understood that the indicator 12 would display spots $S_1$ and $S_2$ representing the range and azimuth positions of the two respective objects in the area under surveillance on the screen 19 in a conventional manner; that is, both spots would have the same intensity, duration and size if the altitude layer selector 22 is not in operation. Assume now that the controller desires to determine the traffic within a particular altitude layer. The values of the upper limit set 24 and the lower limit set 25 are selected by the controller to permit only analog altitude pulses whose amplitudes are indicative of aircraft having altitudes within the selected altitude layer to cause the amplifier 26 to produce an intensity control pulse.

Assume now that the first object represented by the spot $S_1$ is outside the particular altitude layer selected by the controller, and that the second object represented by the spot $S_2$ is within the selected altitude layer. When the antenna is directed at the first object, the amplitude of the resulting analog altitude pulse is outside the values of the upper and lower limit sets which prevent the coincident range pulse from actuating the driver 23 to cause an intensity control pulse from being produced. Accordingly, only the range pulse is applied to intensity control 20 which causes the electron beam 18 to produce the spot $S_1$ of a given intensity, duration and size.

When the antenna is directed at the second object, the amplitude of the resulting analog altitude pulse is within the values of the upper and lower limit sets and permits the coincident range pulse to actuate the driver 23 to cause an intensity control pulse to be produced by the amplifier 26, and accordingly both the range pulse and the intensity control pulse are applied simultaneously to the intensity control 20. Since the intensity control pulse has a greater fixed degree of intensity, duration and size than the range pulse, it dominates the intensity control 20 and causes the electron beam to produce a spot $S_2$ having a greater fixed degree of intensity, duration and size, making it visually distinguishable from spot $S_1$. Consequently, the controller now knows that the second object is within the selected altitude layer and that the first object is not. The altitude resolution can be made as fine as the presently established limits for altitude layers in connection with air traffic control by adjustment of the limit sets 24, 25.

It is to be noted that the altitude layer selector, connected as shown in the drawing, is compatible with existing radar indicators without modification of the latter. That is, all targets show on the radar indicator screen when there is no operator input to the altitude layer selector. In addition, when one radar services a plurality of radar indicators, an altitude layer selector can be provided for each of the indicators, and the operator of each indicator can monitor altitude information without interfering with other indicators.

Referring now to FIG. 3, the details of a suitable altitude layer selector 22 are shown in schematic form. The driver, generally indicated at 23, includes a transistor Q1 having a base 30 connected to an input terminal 31 which is adapted to receive a range pulse from the receiver-computer 21 and an emitter 32 which is connected to a node 46 of a voltage divider, generally indicated at 33, and to ground by a reverse biased diode CR3. The voltage divider 33 is connected between a source of constant potential and ground, and the voltage at the node 46 is sufficient to normally maintain the transistor Q1 in a cut-off condition. The reverse biased diode CR3 enables a negative voltage to be applied to the emitter 32 of the transistor Q1 to permit it to be biased into conduction when a range pulse is applied to the base 30. The base 30 of the transistor Q1 is connected to ground by the low resistance path provided by two serially connected and forwardly biased diodes CR1 and CR2 which are adapted to normally limit the voltage at the base 30 of the transistor Q1 to a potential slightly above ground. Consequently, the amplitude of the voltage applied to the base 30 of the transistor Q1 is limited in value and insufficient to bias the transistor Q1 into conduction because of the voltage applied to the emitter 32 by the node 46 of the voltage divider 33.

The upper limit set, generally indicated at 24, includes a transistor Q2 having a base 35 connected to an input terminal 34 which is adapted to receive an analog altitude pulse from the receiver-computer 21 and an emitter 37 which is normally open circuited but adapted to be connected to a voltage divider network, generally indicated at 39, by one of a series of switch contacts 42. In addition, the transistor Q2 is electrically connected to ground and a node 45 between the serially connected diodes CR1 and CR2. The transistor Q2 is normally nonconductive due to the open circuit connection of the emitter 37. However, upon closure of one of the switch contacts 42 connecting the emitter 37 to the voltage divider 39 and the receipt of an analog altitude pulse having an amplitude greater than the voltage applied to the emitter 37 through the switch contact 42, the transistor Q2 is biased into conduction and applies a negative pulse to the node 45 which further reduces the voltage applied to the base 30 of the transistor Q1 by a range pulse to disable the transistor Q1 from conducting.

The lower limit set, generally indicated at 25, includes a transistor Q3 having a base 36 connected to the input terminal 34 and an emitter 38 connected to a source of constant potential and adapted to be connected to a voltage divider network, generally indicated at 40, by one of a series of switch contacts 43. In addition, the transistor Q3 is electrically connected to ground and the node 46 of the voltage divider 33. The transistor Q3 is normally non-conductive due to the connection of the emitter 37 to the source of constant potential which is sufficient to maintain the transistor cut-off condition. However, upon closure of one of the switch contacts 43 connecting the emitter 38 to the voltage divider 40 and the receipt of an analog altitude pulse having an amplitude greater than the voltage applied to the emitter 38 through the switch contact 43, the transistor Q3 is biased into conduction and applies a negative pulse to the node 46 which sufficiently reduces the voltage applied to the emitter 32 of transistor Q1 to enable the transistor Q1 to conduct upon receipt of a coincident range pulse at the input terminal 31, provided the amplitude of the analog altitude pulse is insufficient to bias the transistor Q2 into conduction.

The amplifier, generally indicated at 26, includes a transistor Q4 which is responsive to the conduction of the transistor Q1 to produce an intensity control pulse having a duration greater than that of the coincident range and altitude pulses which, in turn, is applied to the intensity control 20. The greater duration of the intensity control pulse as compared to the range pulse which is applied simultaneously therewith to the intensity control 20, is accomplished in the following manner. Upon receipt of a range pulse at the input terminal 31 and a coincident analog altitude pulse at the input terminal 34 having an amplitude insufficient to bias the transistor Q2 into conduction but sufficient to bias the transistor Q3 into conduction, a positive pulse is applied to the base 30 of the transistor Q1 and a negative pulse is applied to the emitter 32 of the transistor Q1, which biases the transistor Q1 into saturation, which in turn biases the transistor Q4 into saturation.

While the transistors Q1 and Q4 are biased into saturation, current carriers are stored in the base regions of both of the transistors. Upon termination of the coincident range and analog altitude pulses, the bias on the transistor Q1 is removed. However, the transistor Q1 continues to conduct for an additional amount of time, commonly referred to as the storage time, during which the current carriers stored in the base region are swept from the base-collector junction. As a result, the conduction of the transistor Q1, which in turn biases the transistor Q4 into saturation, has a longer duration than the coincident range and altitude pulses applied to the input terminals 31 and 34. Likewise, upon termination of the conduction of the transistor Q1, the transistor Q4 continues to conduct for an additional amount of time, that is the storage time, during which the current carriers stored in the base region are swept from the base-collector junction. Accordingly, the intensity control pulse has a duration greater than the coincident range and analog altitude pulses by an amount equal to the storage times of both the transistor Q1 and the transistor Q4. Although high frequency transistors could be used for the transistors Q1 and Q4, it is desirable to use a low frequency transistor to obtain a longer storage time and accordingly an intensity control pulse having a much greater duration than the coincident range and analog altitude pulses.

The voltage divider networks, generally indicated at 39 and 40, each include a plurality of equal valued resistors 41 and 42 respectively, which are serially connected between a source of constant potential and ground. Switch contacts are connected to the junctions between the resistors to provide a series of voltages differing from each other by discrete and equal values. Rheostats are serially connected with the equal valued resistors at both the ground and potential source ends of the voltage dividers so that the series of voltages may be uniformly varied and increased or decreased in value.

The voltages applied to the emitter 37 of the transistor Q2 and the emitter 38 of the transistor Q3 by the voltage divider networks 39 and 40 respectively are selectively controllable by the operator through a series of push buttons, P1 to P6, each of which is mechanically connected to one of each of the series of switch contacts 42 and 43 respectively. Accordingly, the controller can selectively apply a particular voltage to the emitters 37 and 38 of the transistors Q2 and Q3 respectively, and thereby limit both the upper and lower amplitude values of an analog altitude pulse which will cause an intensity control pulse to be applied to the intensity control 20, thus determining the altitude layer which is to be inspected.

For example, suppose that it is desired to inspect the area under surveillance in altitude layer of 2,500 feet each from ground to 15,000 feet and that an analog altitude pulse having an amplitude of 4 volts represents an altitude of 10,000 feet. Therefore, an analog altitude pulse having an amplitude between 0 and 1 volt represents an altitude from ground to 2,500 feet; and the amplitudes of analog altitude pulses representing other altitudes can be determined in the same manner. Accordingly, the series of equal voltages of the voltage divider network 39 would be adjusted to vary by discrete steps from 1–6 volts while the series of equal voltages of the voltage divider network 40 would be adjusted to vary by discrete steps from 0–5 volts.

If the aircraft controller desires to determine which if any aircraft are in the altitude layer between 10,000–12,500 feet, he depresses button P5 thereby causing 5 volts to be applied to the emitter 37 of transistor Q2 and 4 volts to be applied to the emitter 38 of transistor Q3. As the radar antenna scans the area under surveillance it produces coincident range pulses and analog altitude pulses for each aircraft in the area under surveillance which are applied respectively to input terminals 31 and 34 of the altitude layer selector 22.

If an aircraft is at an altitude less than 10,000 feet and thus below the selected altitude layer, the resulting analog altitude pulse has an amplitude less than 4 volts. Since the amplitude of the analog altitude pulse is insufficient to bias the transistor Q3 into conduction because of the 4 volts applied to the emitter 38, the transistor Q1 will remain in its cut-off condition and the range pulse applied to the input terminal 31 will have no effect.

If an aircraft is at an altitude greater than 12,500 feet and thus above the selected altitude layer, the resulting analog altitude pulse has an amplitude greater than 5 volts. Although the amplitude of the analog altitude pulse is sufficient to bias the transistor Q3 into conduction and cause a negative pulse to be applied to the emitter 32 of the transistor Q1, the amplitude of the analog altitude pulse is also sufficient to bias the transistor Q2 into conduction to cause a negative pulse to be applied to the node 45, thereby reducing the voltage applied to the base 30 of the transistor Q1 and disabling it from conducting.

Finally, if an aircraft is at an altitude of 11,500 feet and thus within the selected altitude layer, the resulting analog altitude pulse has an amplitude of 4.6 volts. Since the amplitude of the analog altitude pulse is less than the 5 volts applied to the emitter 37 of the transistor Q2, the transistor Q2 is not biased into conduction and hence the voltage at the base 30 of the transistor Q1 is not reduced. In addition, since the amplitude of the analog altitude pulse is greater than the 4 volts applied to the emitter 38 of the transistor Q3, the transistor Q3 is biased into conduction and causes a negative pulse to be applied to the emitter 32 of the transistor Q1. The coincidence of a positive pulse at the base 30 and a negative pulse at the emitter 32 of the transistor Q1 causes it to be biased into saturation which, in turn, causes the transistor Q4 to be biased into saturation to produce an intensity control pulse having a greater amplitude and duration as previously explained. When the range pulse and the intensity control pulse are simultaneously applied to the intensity control 20, the intensity control pulse causes the illumination of the spot representing the aircraft at 11,500 feet to be increased in intensity, duration and size to indicate to the controller that the particular aircraft represented by the spot is within the selected altitude layer.

In the time sequence graph of FIG. 2, the relative time and amplitude relationships of range, altitude and intensity control pulses for a typical example are schematically illustrated.

While the invention has been illustrated and described with respect to a single preferred embodiment it will be obvious to those skilled in the art that various embodiments, modifications, and improvements may be made. For example, the contacts 42 and 43 of the push-button switches P1 to P6 may be individually controlled instead of ganged in pairs. Also, a greater number of smaller, individual resistors in the voltage divider networks 39 and 40 along with a greater number of push-button switches would permit the resolution of the altitude to be as fine as possible taking into consideration the radar and computer accuracies. In addition, the analog altitude pulse could be applied to the input terminal 31 of the driver 23 instead of the range pulse.

Also, if the surveillance radar is of the type that transmits a beam of RF energy narrow in azimuth and having a broad vertical angle used in conjunction with a separate stationary receiver having an antenna array which is adapted to detect slight phase differences in the echo pulses from targets at different elevations, it is to be understood that the altitude and range signals applied to the altitude layer selector could both be produced by the separate receiver-computer as described herein or in the altitude pulse could be produced by the separate receiver-computer and the range pulse could be produced at the surveillance radar.

As another modification the values of the series of input to intensity control 20 could be eliminated and the altitude layer selector 22 could be modified to permit the intensity control pulse produced by amplifier 26 to cause all targets to be displayed when no buttons are depressed and to cause only those targets within the preselected altitude layer to be displayed when selected buttons are depressed. This modification is achieved by removing the 12 volt bias on the emitter 38 of the transistor Q3 and instead connecting the emitter to ground.

As another modification, the values of the series of voltages provided by the voltage divider networks could be adjusted to provide overlapping altitude layers instead of contiguous or separated altitude layers and thus provide an air traffic controller with a margin of time in which to detect impending collisions between targets undergoing rapid changes in altitude.

That which is claimed is:
1. A radar system, comprising:
 a surveillance radar adapted to detect targets within an area under surveillance and produce output signals representative of the range, azimuth and altitude of each individual target within the area under surveillance,
 an indicator having a luminescent screen and spot-producing means responsive to the output signals from said surveillance radar to produce on the screen for each individual target within the area under surveillance an illuminated spot having a given degree of intensity and with a position on the screen indicative of the range and azimuth of the particular individual target whereby all targets within the area under surveillance will be represented on the screen by spots having positions indicative of the range and azimuth of the targets, and
 selective display means adapted to receive the output signals produced by said surveillance radar for each individual target within the area under surveillance and being connected in controlling relation to said indicator and selectively responsive to the output signals representative of the altitudes of targets within the upper and lower limits of a selected altitude layer to cause only those spots produced on the screen of said indicator and representative of such targets to be increased in intensity by an amount sufficient to visually distinguish them from the given degree of intensity of the spots present on the screen of said indicator and representing targets above and below the upper and lower limits of the selected altitude layer.

2. A radar system according to claim 1 wherein said selective display means further comprises:
  display-modifying means adapted to be responsive to the output signals produced by said surveillance radar for each individual target within the area under surveillance to cause the spots produced on the screen of said indicator and representative of all of the targets in the area under surveillance to be increased in intensity by a fixed amount,
  enable means adapted to receive the signals representative of the altitudes of the targets within the area under surveillance and being connected in controlling relation to said display-modifying means and responsive only to those output signals representative of the altitudes of targets above the lower altitude limit of a selected altitude layer to actuate the display-modifying means to enable it to increase the intensity of the spots representative of targets at altitudes above the lower altitude limit of the selected altitude layer, and
  disable means adapted to receive the output signals representative of the altitudes of the targets within the area under surveillance and being connected in controlling relation to said display-modifying means and responsive only to those output signals representative of the altitudes of targets above the upper altitude limit of the selected altitude layer to prevent said display-modifying means from being actuated and disable it from increasing the intensity of the spots representative of targets at altitudes above the upper altitude limit of the selected altitude layer.

3. A radar system according to claim 2:
  said enable means being adapted to receive a threshold signal representative of an altitude and respond only to those output signals representative of the altitudes of targets above the altitude represented by the threshold signal,
  lower threshold level means adapted to produce signals representative of selected altitudes and having means adapted to selectively apply one of the signals to said enable means as a threshold signal to control the output signals representative of the altitudes of targets to which the enable means will respond and thus establish the lower altitude limit of the selected altitude layer,
  said disable means being adapted to receive a threshold signal representative of an altitude and respond only to those output signals representative of the altitudes of targets above the altitude represented by the threshold signal, and
  upper threshold means adapted to produce signals representative of selected altitudes and having means to selectively apply one of the signals to said disable means as a threshold signal to control the output signals representative of the altitudes of targets to which the disable means will respond and thus establish the upper altitude limit of the selected altitude layer.

4. A radar system according to claim 3:
  said surveillance radar being adapted to produce analog output signals representative of the altitude of earth individual target within the area under surveillance with the amplitudes of the analog output signals being proportional to the altitudes of the targets,
  said lower threshold level means being adapted to produce signals having amplitudes proportional to and representative of selected altitudes,
  said enable means including a variable-conductance, current-conducting control device having a threshold current-conducting level as selectively determined by the amplitude of the threshold signal received from said lower threshold level means and being responsive only to analog output signals representative of the altitudes of the targets within the area under surveillance having an amplitude greater than the threshold current-conducting level as selectively determined by said lower threshold level means,
  said upper threshold level means being adapted to produce signals having amplitudes proportional to and representative of selected altitudes,
  said disable means including a variable-conductance, current-conducting control device having a threshold current-conducting level as selectively determined by the amplitude of the threshold signal received from said upper threshold level means and being responsive only to analog output signals representative of the altitudes of the targets within the area under surveillance having an amplitude greater than the threshold current-conducting level as selectively determined by said upper threshold level means.

5. A radar system according to claim 4:
  said lower threshold level means including a first variable voltage network adapted to produce selected voltages having values associated with selected altitudes and including control means to selectively apply each of said voltages to said variable-conductance, current-conducting control device,
  said upper threshold level means including a second variable voltage network adapted to produce selected voltages having values associated with selected altitudes and including control means to selectively apply each of said voltages to said variable-conductance current-conducting control device.

6. A radar system according to claim 5:
  said lower threshold level means including adjustable means to vary the values of the selected voltages produced by the first variable voltage network and a first series of switches with each switch being associated with one of the series of voltages produced by the first voltage divider network,
  said upper threshold level means including adjustable means to vary the values of the selected voltages produced by the second variable voltage network, and having a second series of switches with each switch being associated with one of the series of voltages produced by the second variable voltage network,
  said enable means including a first transistor as the variable-conductance, current-conducting control device,
  said disable means including a second transistor as the variable-conductance, current-conducting control device.

7. A radar system according to claim 6, further comprising:
  a series of push buttons with each of the push buttons being mechanically connected to one of the switches of both the first and second series of switches to cause a threshold voltage to be simultaneously applied to the first and second transistors in the enable and disable means from the first and second variable voltage networks of the lower and upper threshold level means respectively.

8. A radar system according to claim 1:
  said indicator spot-producing means being responsive to the output signals from said surveillance radar and normally adapted to produce only illuminated spots having both a given degree of intensity and size whereby all targets within the area under surveillance will be represented on the screen by spots having positions indicative of the range and azimuth of the targets, and
  said selective display means being selectively responsive to the output signals representative of the altitude of targets within the upper and lower limits of the selected altitude layer to cause only those spots produced on said indicator screen and representative of such targets to be increased in both intensity and size by an amount sufficient to visually distinguish them from the given degree of intensity and size of the spots representing targets above and below the upper and lower limits of the selected altitude layer.

9. A radar system, comprising:

a surveillance radar adapted to detect targets within an area under surveillance and produce output signals representative of the range, azimuth and altitude of each individual target within the area under surveillance, an indicator having a luminescent screen and spot producing means responsive to the output signals from said surveillance radar to produce on the screen for each individual target within the area under surveillance an illuminated spot having a given size and with a position on the screen indicative of the range and azimuth of the particular individual target whereby all targets within the area under surveillance will be represented on the screen by spots having positions indicative of the range and azimuth of the targets, and selective display means adapted to receive the output signals produced by said surveillance radar for each individual target within the area under surveillance and being connected in controlling relation to said indicator and selectively responsive to the output signals representative of the altitudes of targets within the upper and lower limits of a selected altitude layer to cause only those spots produced on the screen of said indicator and representative of such targets to be increased in size by an amount sufficient to visually distinguish them from the size of the spots present on the screen of said indicator and representing targets above and below the upper and lower limits of the selected altitude layer.

10. A radar system, comprising:

a surveillance radar adapted to detect targets within an area under surveillance and produce output signals representative of the range, azimuth and altitude of each individual target within the area under surveillance, an indicator having a single color luminescent screen and spot producing means responsive to the output signals from said surveillance radar to produce on the screen for each individual target within the area under surveillance an illuminated spot having a fixed degree of intensity and with a position on the screen indicative of the range and azimuth of the particular individual target whereby all targets within the area under surveillance will be represented on the screen by spots having a common fixed degree of intensity and positions indicative of the range and azimuth of the targets, and selective display means adapted to receive the output signals produced by said surveillance radar for each individual target within the area under surveillance and being connected in controlling relation to said indicator and selectively responsive to the output signals representative of the altitudes of targets within the upper and lower limits of a selected altitude layer to cause only those spots produced on the screen of said indicator and representative of such targets to be increased in intensity by a fixed amount to distinguish them from the common fixed degree of intensity of the spots present on the screen of said indicator and representing targets above and below the upper and lower limits of the selected altitude layer.

11. A radar system, comprising:

a surveillance radar adapted to detect targets within an area under surveillance and produce output signals representative of the range, azimuth and altitude of each individual target within the area under surveillance, an indicator having a single color luminescent screen and spot-producing means responsive to the output signals from said surveillance radar to produce on the screen for each individual target within the area under surveillance an illuminated spot having a fixed size and with a position on the screen indicative of the range and azimuth of the particular individual target whereby all targets within the area under surveillance will be represented on the screen by spots having a common fixed size and positions indicative of the range and azimuth of the targets, and selective display means adapted to receive the output signals produced by said surveillance radar for each individual target within the area under surveillance and being connected in controlling relation to said indicator and selectively responsive to the output signals representative of the altitudes of targets within the upper and lower limits of a selected altitude layer to cause only those spots produced on the screen of said indicator and representative of such targets to be increased in size by a fixed amount to distinguish them from the common fixed size of the spots present on the screen of said indicator and representing targets above and below the upper and lower limits of the selected altitude layer.

12. Apparatus for displaying targets, comprising:

a display medium, spot-producing means adapted to respond to signals representing the azimuth and range values from a selected spatial point of a plurality of targets within a given area to form spots on said display medium having a given degree of intensity and with positions representative of the azimuth and range values of the individual targets within a given area, and display-modifying means adapted to respond to signals representative of the altitudes of individual targets within the given area for selectively intermittently increasing by a sufficient amount the intensity of the spots on said display medium representative of targets having an altitude within the upper and lower limits of a selected altitude layer to visually distinguish such spots from other spots having a given degree of intensity and representing targets having altitudes above and below the upper and lower limits of the selected altitude layer.

13. Apparatus for displaying targets, comprising:

a display medium, spot-producing means adapted to respond to signals representing the azimuth and range values from a selected spatial point of a plurality of targets within a given area to form spots on said display medium having a fixed degree of intensity and with positions representative of the azimuth and range values of the individual targets within a given area, and display-modifying means adapted to respond to signals representative of the altitudes of individual targets within the given area for selectively intermittently increasing by a given fixed amount the intensity of the spots on said display medium representative of targets having an altitude within the upper and lower limits of a selected altitude layer to distinguish such spots from other spots having a common fixed degree of intensity and representing targets having altitudes above and below the upper and lower limits of the selected altitude layer.

14. Apparatus for displaying targets according to claim 13:

said spot-producing means being adapted to respond to signals representing the azimuth and range values from a selected spatial point of a plurality of targets within a given area to normally form spots on said display medium having both a fixed degree of intensity and size whereby all targets within the given area will be represented on the screen by spots having a fixed degree of intensity and size and with positions indicative of the range and azimuth of the targets, and said display-modifying means being selectively responsive to signals representative of the altitudes of targets within the upper and lower limits of the selected altitude layer to cause only those spots produced on said display medium and representative of such targets to be increased in both intensity and size by a fixed amount to distinguish them from the common fixed degree of intensity and size of the spots representing targets above and below the upper and lower limits of the selected altitude layer.

15. A radar system, comprising:

a surveillance radar adapted to detect targets within an area under surveillance and produce output signals representative of the range, azimuth and altitude of each individual target within the area under surveillance.

an indicator having a luminescent screen and spot-producing means responsive to the output signals from said surveillance radar to produce on the screen for each individual target within the area under surveillance an illuminated spot having a given visual indication and with a position on the screen indicative of the range and azimuth of the particular individual target whereby all targets within the area under surveilance will be represented on the screen by spots having positions indicative of the range and azimuth of the targets, and selective display means adapted to receive the output signals produced by said surveillance radar for each individual target within the area under surveillance and being connected in controlling relation to said indicator and selectively responsive to the output signals representative of the altitudes of targets within the upper and lower limits of a selected altitude layer to cause those spots produced on the screen of said indicator and representative of such targets to be visually distinguishably differentiated in visual indication by an amount sufficient to visually distinguish them from the given visual indication of the spots present on the screen of said indicator and representing targets above and below the upper and lower limits of the selected altitude layer.

16. Apparatus for displaying targets, comprising:

a display medium, spot-producing means adapted to respond to signals representing the azimuth and range values from a selected spatial point of a plurality of targets within a given area to form characteristic display spots on said display medium and with positions representative of the azimuth and range values of the individual targets within a given area, and display-differentiating means adapted to respond to signals representative of the altitudes of individual targets within the given area for visually distinguishably differentiating the display of the spots on said display medium representative of targets having an altitude within the upper and lower limits of a selected altitude layer by a visually clearly distinguishable extent to visually distinguish such spots from other spots representing targets having altitudes above and below the upper and lower limits of the selected altitude layer.

References Cited

UNITED STATES PATENTS 3,072,818    1/1963    Raffonsperger ____ 343—7.9 XR

FOREIGN PATENTS 588,851    6/1947    Great Britain.

RODNEY D. BENNETT, Jr., Primary Examiner

T. H. TUBBESING, Assistant Examiner

U.S. Cl. X.R.

343—5; 315—22